United States Patent

[11] 3,591,207

| | | |
|---|---|---|
| [72] | Inventor | Leonard A. Fisher<br>Granby, Conn. |
| [21] | Appl. No | 846,468 |
| [22] | Filed | July 31, 1969 |
| [45] | Patented | July 6, 1971 |
| [73] | Assignee | The H. B. Smith Company, Incorporated<br>Westfield, Mass. |

[54] LEAK-TIGHT SEAL BETWEEN MATING PORTIONS OF ASSEMBLED HOLLOW CASTINGS
4 Claims, 5 Drawing Figs.

[52] U.S. Cl..................................... 285/111,
277/206.1, 285/328, 285/399
[51] Int. Cl.............................................. F16l 17/00
[50] Field of Search........................................... 277/205,
206, 206.1, 207, 227; 260/85.3; 285/111, 328, 399

[56] References Cited
UNITED STATES PATENTS
3,098,055   7/1963   Lemiszka et al.............. 260/85.3 (C)
3,104,235   9/1963   Kuntz et al ............  260/85.3 (C)
3,255,154   6/1966   Dudley ........  ........  260/85.3 (C)
3,261,789   7/1966   Berger    ....  ....  260/85.3 (C)
FOREIGN PATENTS
762,232   11/1956   Great Britain..............   277/206

Primary Examiner—Laverne D. Geiger
Assistant Examiner—Robert I. Smith
Attorney—Roberts, Cushman, & Grover ABSTRACT: A leak-tight seal between two cast iron parts (for example, cast iron boiler sections) such that machining of the metal parts is not required, and wherein resilient gaskets are substituted for the usual metal push nipples. One of the parts has a rabbet opening at it inner periphery. The rabbet is adapted to completely contain the gasket when the two parts are drawn together. The gasket is characterized in that it has outer and inner peripheral grooves.

PATENTED JUL 6 1971                    3,591,207
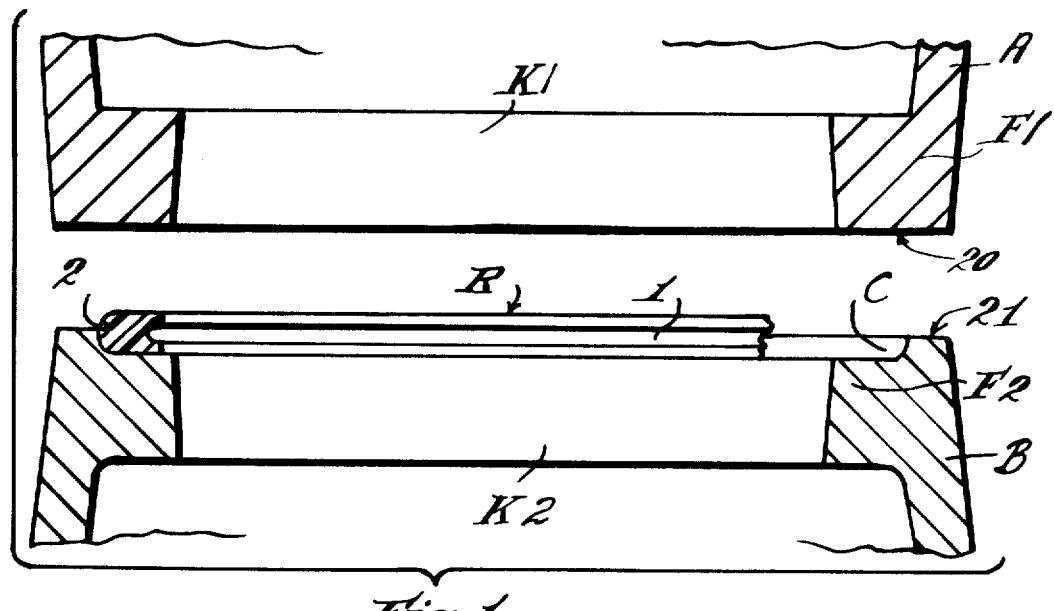
Fig.1
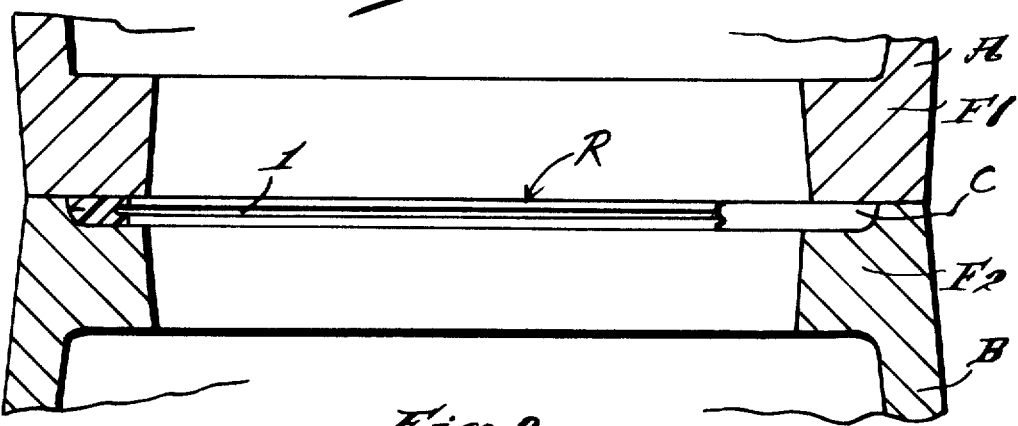
Fig.2
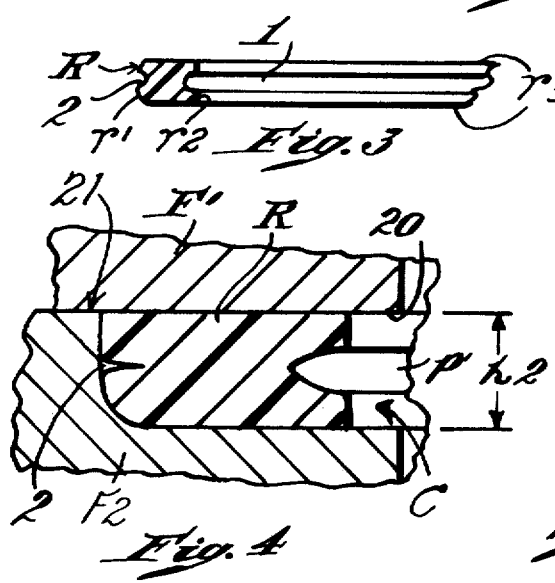
Fig.3
Fig.4
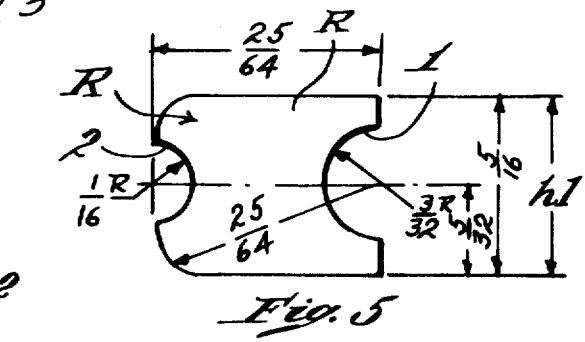
Fig.5
Inventor
Leonard A. Fisher
by [signature]
Attys

LEAK-TIGHT SEAL BETWEEN MATING PORTIONS OF ASSEMBLED HOLLOW CASTINGS

BACKGROUND OF THE INVENTION

The invention pertains to the sealing of water, steam or other pressure fluid between mating sections of apparatus such as sectional cast iron boilers, radiators, cast flanges, pipe unions, or the like. The principal object of this invention is to provide a dependable seal between opposed surfaces of relatively rough sand castings. Previously, it has been customary to machine the surfaces of castings in order to obtain a dependable seal, and to provide tapered or spherical metallic push nipples between the two mating vessels.

Although the utility of the seal of the present invention is not restricted to sectional cast iron boilers, radiators, or the like, the only illustrations and description here given are so limited for convenience.

Typically, a cast iron, sectional heating boiler is assembled by using draw-bolts to draw accurately machined conical or spherical push nipples into accurately machined tapered ports of adjacent hollow castings so as to effect a metal-to-metal seal, and at the same time to provide a free fluid passage between the interiors of the castings. In order to obtain such a metal-to-metal seal, it is necessary, not only to keep the diameters and tapers under close tolerances, but also the surfaces must be free from flaws, scratches, sand holes or grit. Also, in assembling a cast iron sectional boiler, at least two and usually three rigid seals (push nipples) are used between each pair of sections, and it is essential that the centerline distances of the sections as well as their parallelism be kept within very close tolerances. These requirements make it extremely difficult to manufacture large cast iron sectional, push nipple boilers. To assemble these large boilers they must be carefully aligned on very flat foundations. Furthermore, the rigid push nipple assembly lacks flexibility so that thermal expansion, as well as residual casting stresses, sometimes create extreme shear forces on the unyielding push nipples and the ports which receive them.

This invention eliminates all of the above disadvantages, by a combination of several properties and principles, which interact to provide a dependable pressure seal between two unmachined sand castings. In so doing, the invention substitutes a gasket of resilient, yieldable material for the rigid metallic nipple. To be acceptable for such use, the material of the gasket must have properties such as to operate for many years in the environment of its application. This environment may include exposure to air, water, steam, and combustion products of natural gas or fuel oil, all at temperatures ranging from room temperature (40° to 100° F.) up to near 250° F. and occasionally 300° F. The physical properties of the gasket must not change appreciably during a long period (measured in years) of service, and must include the proper softness and resilience (memory) so that when the gasket is compressed, it will flow intimately into the pits and over the peaks of the unfinished sand-castings' surfaces, but will not take a permanent set which would allow a release of compression after repeated expansions and contractions caused by cyclic heatings and coolings. The material must not harden or dry out (oxidize) as would ordinary rubber. Neither must it swell or shrink. The configuration of the seal assembly requires close coordination between the resilient (elastic) properties and the initial compressibility of the material.

In the annexed drawings:

FIG. 1 is a fragmentary view showing, in diametrical section, the flanges or bosses of two axially aligned but disassembled boiler sections and a sealing ring or gasket in accordance with the present invention assembled with one of said sections but uncompressed;

FIG. 2 is a section in the same plane as FIG. 1 but showing the parts as they would appear when the two boiler sections have been drawn together, thus compressing the sealing ring or gasket;

FIG. 3 is a fragmentary diametrical section showing the inner edge of the sealing ring or gasket before it has been compressed;

FIG. 4 is a fragmentary section to larger scale than FIG. 2 showing more clearly the functional structure of the gasket; and FIG. 5 is a fragmentary diametrical section of the gasket in the uncompressed condition, to which certain dimensional indicia have been applied.

Referring to the drawings and in particular to FIG. 2, the characters A and B designate two hollow sections, for example, of a cast iron boiler, whose opposed annular thickened portions or flanges F1 and F2, respectively, define the openings K1 and K2 by which the interiors of the assembled sections communicate.

The flange F1 has a flat radial face 20 extending from its outer surface to the opening K1, while the radial face 21 of the flange F2 extends inwardly from its outer surface a relatively short distance, being then interrupted by an annular recess or rabbet C, FIGS. 1 and 2, while leaving the flat radial face 21 of the flange for direct contact with the radial face 20 of the flange F1. As these flat metal surfaces thus contact each other, axial alignment is not critical.

A gasket R (FIG. 3) is provided for interposition between the flanges F1 and F2 within the rabbet C which, as shown herein, has an outer side $r1$ corresponding substantially in configuration to the outer side of the rabbet C, an inner side $r2$ corresponding substantially in configuration to the openings K1 and K2, spaced parallel flat surfaces $r3-r3$, and is, when uncompressed, substantially twice as thick as the rabbet is deep. When the gasket is compressed between the sections such compression takes place wholly within the rabbet C. The rabbet C is located in the section B at the side which is the more remote from the source of high temperature, that is, the hot gases, so that to a large extent the temperature of these gases are dissipated to nearly the temperature of the water by the time they reach the gasket R and so lessen to a considerable extent the severity of the temperature changes to which the gasket is exposed. The sealing ring or gasket R, uncompressed, is of a thickness $h1$ (FIG. 5) which may, for example, be five-sixteenths of an inch, but when it is fully compressed between the opposed flanges F1 and F2 of the assembled sections A and B (FIG. 2) is reduced to a thickness $h2$ (FIG. 4).

The ratio of $h_1/h_2$ must bear a particular relation to the elastic modulus and the fluid properties of the ring so that the material will develop an internal pressure such that all surface pits of the iron will be filled with the seal material. However, if the ratio $h_1/h_2$ be too great, the material is stressed beyond its elastic limit and will take a permanent set and will not follow the expansions and contractions of the sections.

It has been shown by experiment that a chlorobutyl rubber possesses all the characteristics desirable in a gasket for the particular purpose herein suggested. Thus, a gasket of said material and having structural features such as herein described, and particularly when installed between metal parts shaped, as here illustrated, may be depended upon to prevent leaks under conditions of use such as above described. The material of the gasket of the present invention possesses resistance to compression-set and does not deteriorate when subjected continuously to water at a temperature of 260° F. and/or when subjected intermittently to water at a temperature of 300° F. over a long period of time. The chlorobutyl rubber employed withstands thermal degradation to a high degree.

As shown in FIGS. 4 and 5 the gasket or seal ring R has internal and external grooves 1 and 2, respectively. The outer groove 2 is to reduce surface stress during compression and, in particular, to enable compression perpendicular to the surfaces of the flanges F1 and F2 without substantial lateral compression and thereby to obtain substantially uniform compression throughout the cross-sectional width of the gasket. The inner groove 1 provides stress relief also, but in addition, it allows the hydraulic pressure P1 to be transmitted more directly to the seal medium, thus tending to force the material above and below the groove against the metal surfaces, and the internal pressure becomes $P0 + P1$, where $P0$ represents the pressure produced by drawing the flanges F1 and F2 together. An important but often unnoticed requirement of such a seal is that during heating and cooling, the elastomeric compound of the seal be allowed to expand and contract without greatly changing the initial compressive stress $P0$. The inner groove provides flexible surfaces for such variations to occur repeatedly with resultant longer life.

It is to be understood that while certain specific materials and dimensions as have hereinabove been referred to by way of example, the invention is broadly inclusive of any and all such materials or elements as they may fall within the scope of the appended claims.

I claim:

1. The combination comprising two hollow parts, each containing an aperture affording access to its interior, a flange bounding each aperture, said flanges having relatively flat surfaces extending from the inner sides to the outer sides, said surfaces being rough (unfinished and unground) and the surface of the flange of one part containing a rabbet which extends from its inner side toward its outer side, said rabbet terminating intermediate the inner and outer sides and having a predetermined depth, and a resilient gasket having an outer side corresponding in configuration to the outer side of said rabbet, an inner side corresponding in configuration to the inner side of the flange containing the rabbet, a thickness, when uncompressed, which is greater than the depth of said rabbet, and spaced parallel, substantially flat surfaces, said gasket in its uncompressed condition contains in its outer and inner sides grooves of a predetermined size, and when the parts are drawn together the entire gasket is compressed into the rabbet in the one part and, in said state of compression, the groove at the outer side is substantially closed and the groove at the inner side is partially closed but remains in communication with the interior of the parts, said parts being adapted to be drawn together with the gasket situated in said rabbet to bring the surfaces of the flanges into intimate engagement with each other and the gasket and, when they are mutually engaged, to effect a predetermined compression of the gasket such that the surfaces of the gasket, which have contact with the surfaces of the flange of the one part and the rabbet of the other part flow intimately into and over the depressions and elevations making up the rough unfinished surfaces of the flange and the rabbet at a surface compression of the gasket which does not exceed its elastic limit.

2. The combination according to claim 1, wherein the gasket contains in its outer side midway between its opposed surfaces a groove of such size that compression of the gasket perpendicular to the surfaces is achieved without substantial lateral compression.

3. The combination according to claim 1, wherein the gasket contains in its inner side midway between its opposite surfaces a groove of a configuration and size such that when the gasket is fully compressed the groove is narrower but remains open and in communication with the interior of the parts, and so that the pressure interiorly of the parts presses the wall portions of the gasket at opposite sides of the groove at the inner side of the gasket against the surface of the flange of the one part and the surface of the rabbet in the other part.

4. The combination according to claim 1, wherein the gasket in its uncompressed state is substantially twice as thick as the depth of the rabbet in the one part.